(12) United States Patent
Hanna et al.

(10) Patent No.: US 7,969,673 B2
(45) Date of Patent: Jun. 28, 2011

(54) NIGHT VISION INSTRUMENT FOCUS DEVICE

(75) Inventors: Robert J. Hanna, San Diego, CA (US); Jonathan M. Gumbert, La Mesa, CA (US); Daniel C. Stein, Cos Cob, CT (US)

(73) Assignee: Phokus Research Group, LLC, Rye, NY (US)

( * ) Notice: Subject to any disclaimer, the term of this patent is extended or adjusted under 35 U.S.C. 154(b) by 48 days.

(21) Appl. No.: 12/613,321

(22) Filed: Nov. 5, 2009

(65) Prior Publication Data
US 2010/0187417 A1    Jul. 29, 2010

Related U.S. Application Data

(63) Continuation-in-part of application No. 12/268,893, filed on Nov. 11, 2008.

(51) Int. Cl.
G02B 7/36 (2006.01)
G02B 9/00 (2006.01)
G02B 23/00 (2006.01)

(52) U.S. Cl. ......... 359/894; 359/738; 359/407; 359/410

(58) Field of Classification Search ............ 250/214 LA, 250/214 VT, 330, 485.1; 348/164, 165, 166; 359/356, 407, 410, 738, 739, 894
See application file for complete search history.

(56) References Cited

U.S. PATENT DOCUMENTS

| | | | |
|---|---|---|---|
| 1,936,514 A | 11/1933 | Lengnick |
| 2,868,100 A | 1/1959 | Seur |
| 3,464,757 A | 9/1969 | Schmidt et al. |
| 4,147,417 A | 4/1979 | Mandler |
| 4,371,245 A | 2/1983 | Iwata et al. |
| 4,376,889 A | 3/1983 | Swift |
| 4,425,031 A | 1/1984 | Tamura et al. |
| 4,449,787 A | 5/1984 | Burbo et al. |
| 4,463,252 A | 7/1984 | Brennan et al. |
| 4,547,701 A | 10/1985 | Taylor et al. |
| 4,741,608 A | 5/1988 | Kastendieck et al. |
| 4,909,617 A | 3/1990 | Boyd |
| 5,000,556 A | 3/1991 | Katsuma |
| 5,175,651 A | 12/1992 | Marron et al. |
| 5,212,589 A | 5/1993 | Goodman |
| 5,229,598 A | 7/1993 | Filipovich |
| 5,347,397 A | 9/1994 | Nelson et al. |
| 5,471,678 A | 12/1995 | Dor |
| 5,473,472 A | 12/1995 | Temme et al. |
| 5,541,767 A | 7/1996 | Murphy et al. |
| 5,594,498 A | 1/1997 | Fraley |
| 5,617,257 A | 4/1997 | Sheehy et al. |
| 5,752,106 A | 5/1998 | Yamano |
| 5,760,953 A | 6/1998 | Task et al. |
| 5,950,029 A | 9/1999 | DeCecca et al. |
| 6,031,809 A | 2/2000 | Ohba |
| 6,033,130 A | 3/2000 | Muroi et al. |
| 6,335,759 B1 | 1/2002 | Harada |

(Continued)

OTHER PUBLICATIONS

International Search Report issued Jan. 6, 2010, in the related application PCT/US09/63969.

*Primary Examiner* — David N Spector
(74) *Attorney, Agent, or Firm* — SNR Denton US LLP

(57) ABSTRACT

Provided is a device for improving the focus of an object viewed using a night vision instrument.

23 Claims, 21 Drawing Sheets

U.S. PATENT DOCUMENTS

| | | | |
|---|---|---|---|
| 6,799,854 B1 * | 10/2004 | Steiner | 359/611 |
| 6,811,268 B2 * | 11/2004 | Watson | 359/611 |
| 6,992,275 B1 | 1/2006 | Knapp | |
| 7,116,491 B1 | 10/2006 | Willey et al. | |
| 7,570,879 B2 | 8/2009 | Okawara | |
| 7,721,480 B2 * | 5/2010 | Campean | 42/129 |
| 2007/0223087 A1 | 9/2007 | Pochapsky | |
| 2008/0186584 A1 | 8/2008 | Ballard | |

* cited by examiner

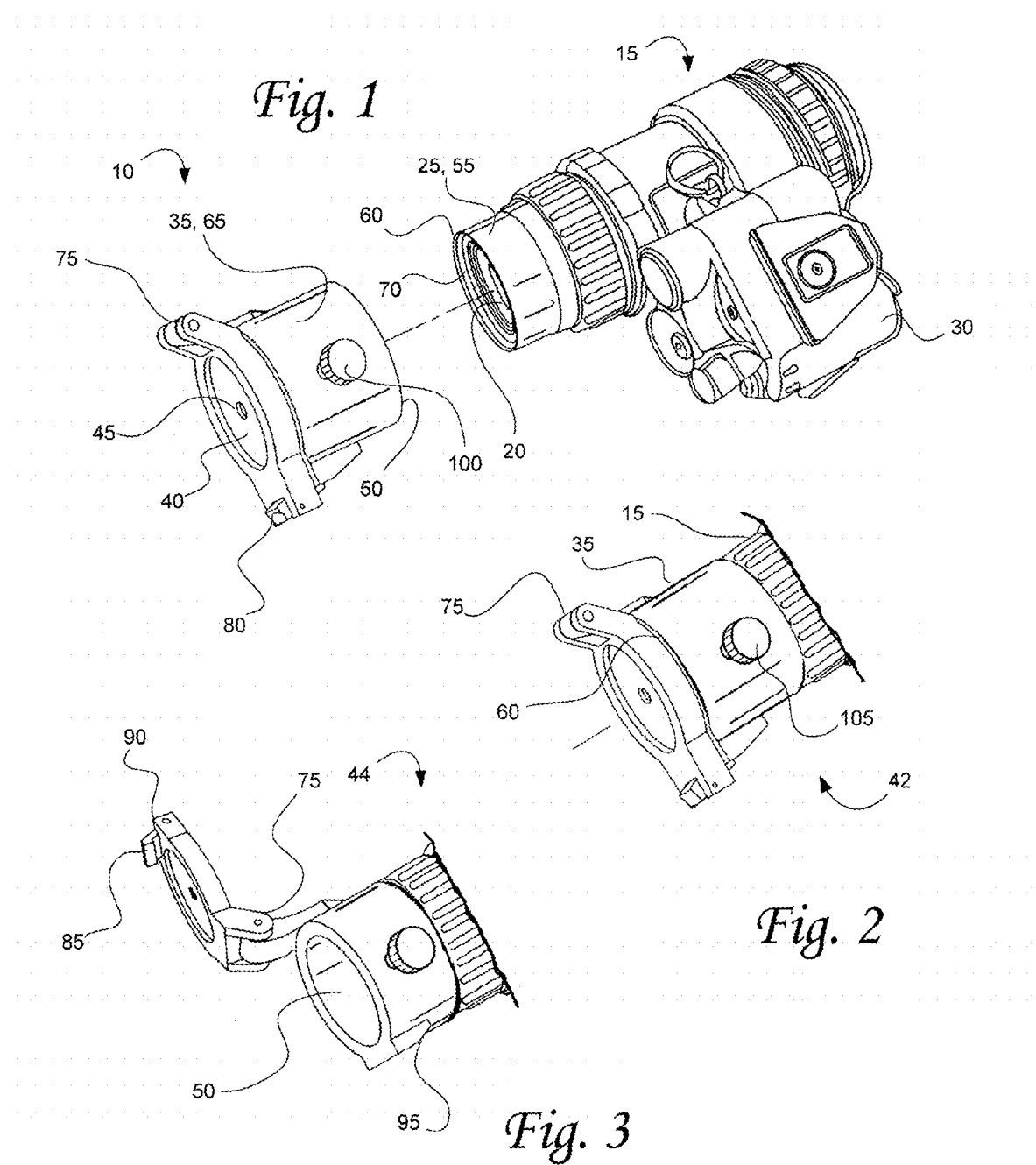

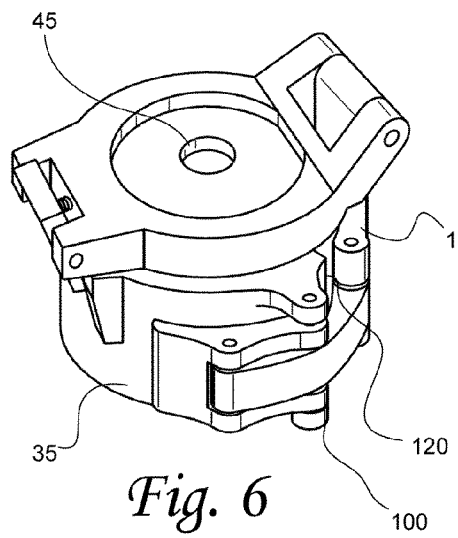
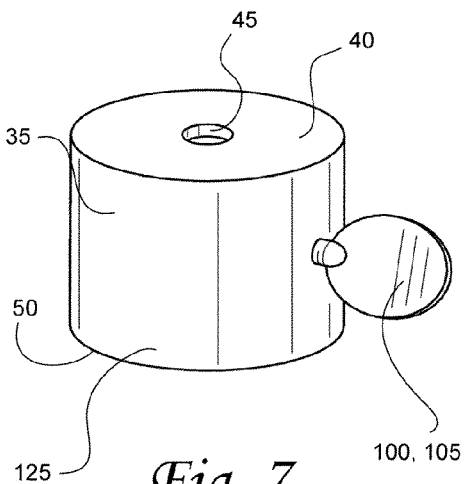
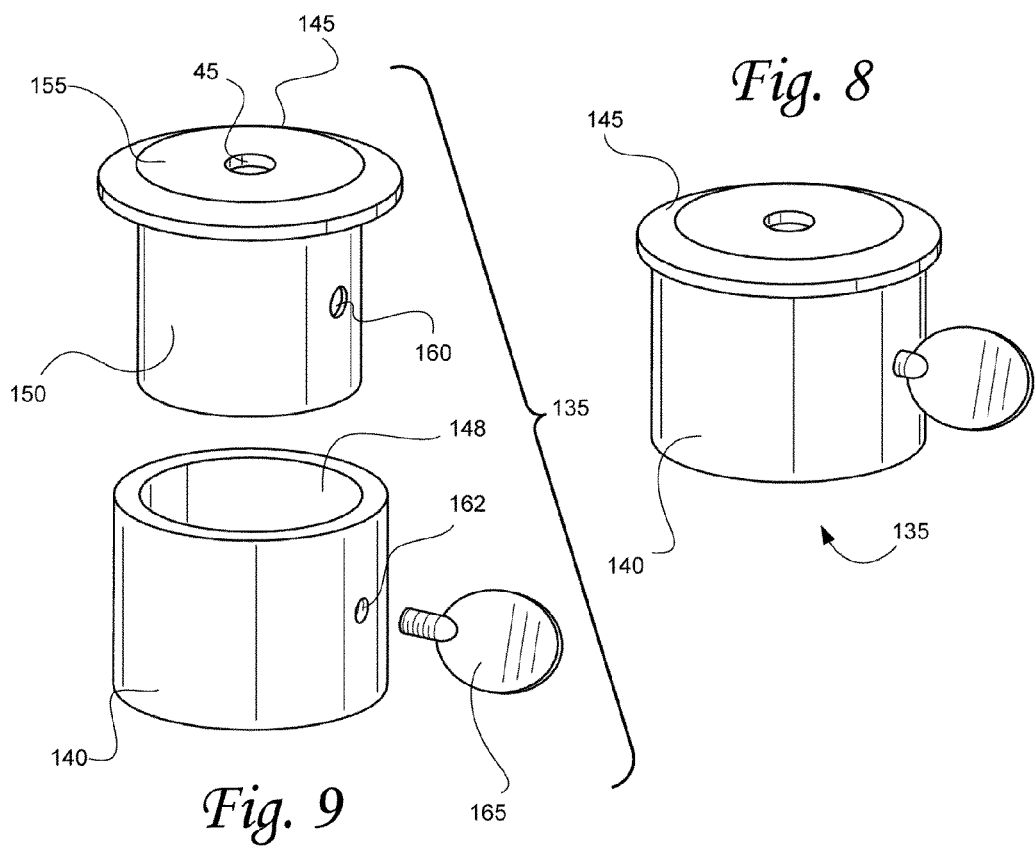

NIGHT VISION INSTRUMENT FOCUS
DEVICE

CROSS-REFERENCE TO RELATED APPLICATION

This application is a continuation-in-part of prior U.S. Nonprovisional application Ser. No. 12/268,893, filed Nov. 11, 2008, and is incorporated herein by reference in its entirety.

TECHNICAL FIELD

The present invention relates to night vision instruments, and more particularly, to devices for improving the focus of an image produced by a night vision instrument and methods of using those devices.

BACKGROUND OF THE INVENTION

The subject invention generally relates to night vision instrument such as night vision goggles. Night vision goggles are typically set to focus at a certain distance. Operators usually adjust the focus for viewing objects far from the operator. This makes anything close to the operator appear blurry. It would be advantageous, therefore, to increase visual clarity for near objects and far objects without having to make adjustments on the night vision goggle itself. It would also be advantageous if one could modify an existing night vision instrument with a device for improving the image clarity for near objects, but be able to quickly and easily revert back and forth between the modified night vision goggle and night vision goggle operation as designed by its manufacturer. The present invention addresses those needs.

SUMMARY

Provided is a device for improving the focus of an object viewed using a night vision instrument, where the night vision instrument comprises an instrument lens, a lens frame comprising a distal end, and night vision components. The device comprises a housing configured to attach to the distal end of the lens frame and a cover coupled to the housing. When the housing is attached to the lens frame, the cover is adjustable to define an aperture allowing light to the lens, the aperture being variable between having at least a first area and a second area, the first area being smaller than the second area; wherein when the device is attached to the night vision instrument, the visual clarity of the object viewed through the instrument and device is superior to the visual clarity of the object when viewed using the instrument without the device, when the object is within 3 feet of the device and the aperture has the first area. In these embodiments, the device does not comprise a device lens.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 1 is an exploded view of a device for improving the focus of an image produced by a night vision instrument in accordance with the principles of the invention.

FIG. 2 is an assembled view of the device connected to the night vision instrument wherein the device is in a closed state.

FIG. 3 is an assembled view of the device connected to the night vision instrument wherein the device is in an open state.

FIG. 6 is an illustration of the device illustrating an alternative securing mechanism for securing the device to a night vision instrument.

FIG. 7 is a illustration of a device having a panel in permanently fixed orientation with the side of the device.

FIG. 8 is an assembled view of alternate embodiment of the device.

FIG. 9 is an exploded view of an alternate embodiment of the device.

Figure 4:
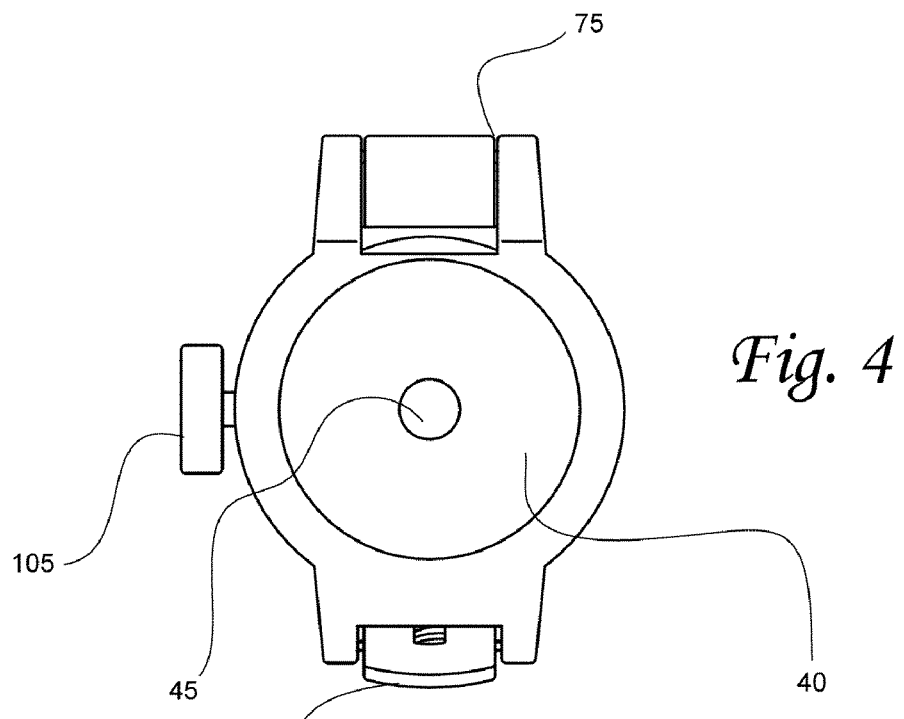
FIG. 4 is a front view of the device for improving the focus of an image produced by a night vision instrument.
Figure 5:
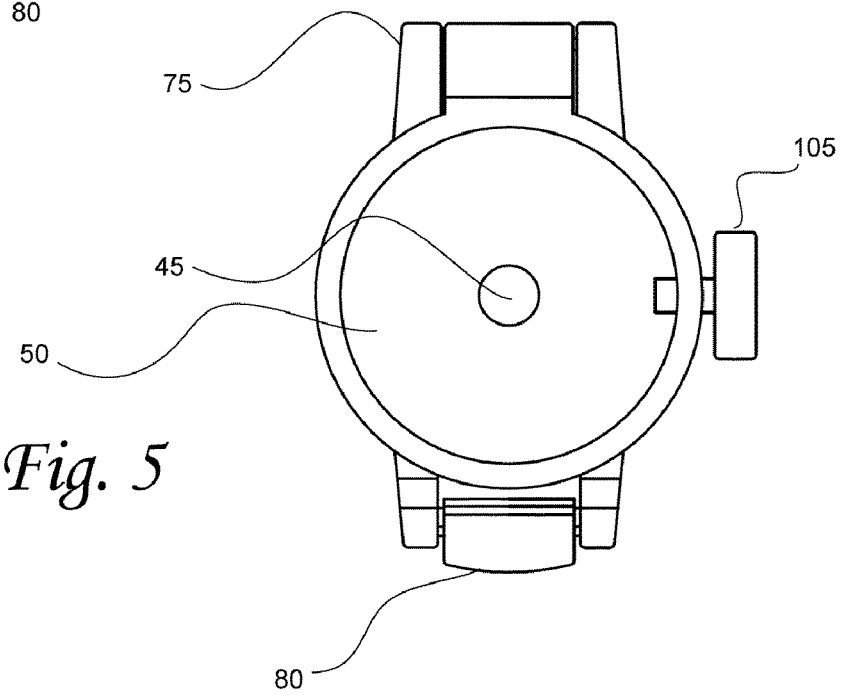
FIG. 5 is a back view of the device for improving the focus of an image produced by a night vision instrument.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

In some embodiments, a device is provided for improving the focus of an object viewed using a night vision instrument, where the night vision instrument comprises an instrument lens, a lens frame comprising a distal end, and night vision components. The device comprises a housing configured to attach to the distal end of the lens frame and a cover coupled to the housing. When the housing is attached to the lens frame, the cover is adjustable to define an aperture allowing light to the lens, the aperture being variable between having at least a first area and a second area, the first area being smaller than the second area; wherein when the device is attached to the night vision instrument, the visual clarity of the object viewed through the instrument and device is superior to the visual clarity of the object when viewed using the instrument without the device, when the object is within 3 feet of the device and the aperture has the first area. In these embodiments, the device does not comprise a device lens.

It is noted that devices previously described for improving close vision for night vision instruments require a lens. See U.S. Pat. Nos. 4,376,889; 5,175,651; 5,617,257 and 5,760,953. The devices described herein have the advantage of not requiring a device lens (i.e., a lens associated with the device, as opposed to the instrument lens, which is a lens integral to a night vision instrument). The instrument lens is the lens of the night vision instrument that is the most distal lens (i.e., the furthest from the instrument user) of the instrument. As such, the instrument lens is the first lens of a night vision instrument to encounter light from the environment. The instrument lens focuses that light to be further processed in more proximal (i.e., closer to the instrument user) lenses and other components in the instrument.

Referring now to FIGS. 1-5, in some embodiments, a device 10 for improving the focus of an image produced by a night vision instrument 15. The night vision instrument 15 may comprise a lens 20, a lens frame 25 and night vision components 30. The device 10 comprises a housing 35 configured to attach to the lens frame 25 and a front panel 40 coupled to the housing 35. The front panel is also defined herein as a cover. The front panel 40 may be manually adjustable between an open state 44 (see e.g. FIG. 3) and a closed state 42 (see e.g. FIG. 2) by a user of the night vision instrument 15. An aperture 45 is disposed in the front panel 40. In these embodiments, the open state is the state where the aperture is more generally defined as having a second area; the closed state is the state wherein the aperture is more generally defined as having a first area. The aperture is configured for viewing objects therethrough.

The devices are not narrowly limited to any particular size of an aperture having a first area or a second area. The aperture size defined herein as the first area should be selected to permit a sufficient amount of light to pass through to permit the night vision instrument to operate suitably for the user's purpose, yet achieve improvement in the focus images produced by the night vision instrument 15. The skilled artisan, with consideration of the teachings herein, could select without undue experimentation an appropriate aperture first area suited for any particular purpose without undue experimentation. See, e.g., Example 1. As established therein, an aperture having a smaller area allows improved visual clarity at closer distances than an aperture having a larger area. A smaller aperture also allows less light to reach the instrument than a larger aperture. The user would thus balance the amount of light needed for adequate vision with the distance where visual clarity is most desired in selecting the aperture most appropriate for the task at hand. Depending on the device configuration, the device could comprise replaceable covers with different apertures, or the aperture area could be adjustable within a single cover. See, e.g., the cover illustrated in FIG. 18, described further below. In some embodiments, the first area has a maximum diameter of about 13/64" or less. In more specific embodiments, the first area has a maximum diameter of about 1/8" or less, e.g., 1/16".

In the embodiments illustrated in FIGS. 1-9, the cover 40 comprises an opening 45 having the first area. The cover further comprises one hinge 75 connecting the cover 40 to the housing 35. Superior visual clarity is achieved by swinging the cover 40 over the instrument lens frame 25 to allow light to the instrument lens 20 having the first area. The aperture having the second area is achieved by swinging the cover away from the lens frame 25. Thus, the second area in these embodiments is equal to the area of the instrument lens without the device.

These embodiments are also not limited to any particular distance between the cover and the instrument lens. The skilled artisan, with consideration of the teachings herein, could select an appropriate distance for any particular purpose without undue experimentation. See, e.g., Example 2, showing that the horizontal field of view increases with decreased distance from the instrument lens. In some embodiments, the cover is about 10/16" or less from the instrument lens. In other embodiments, the cover is about 3/16" or less from the instrument lens, e.g., 2/16". In some embodiments, the cover is disposed at the distal end of the lens frame. The distance from the lens can be adjusted by, e.g., placing a spacer between the lens frame and the cover, or providing a housing that can be set to provide various distances between the lens frame and the cover.

In the embodiments illustrated in FIGS. 1-9, the aperture having the first area 45 is circular. However, the aperture having the first area can be any other shape, e.g., a triangle, a square, a parallelogram, a pentagon, a hexagon, a heptagon, an octagon, a star, etc. Similarly, in the embodiments illustrated in FIGS. 1-9, the front panel (i.e., the cover) is circular. However, the cover can be any shape as appropriate.

FIG. 1 illustrates the device aligned to become attached to the night vision instrument. FIG. 2 illustrates the device attached to the night vision instrument in a closed state. An advantage of the device 10 is it can reduce glare caused ambient visible light sources, to a manageable level by the operator of the night vision instrument.

In one embodiment, when the device 10 for improving the focus of an image is attached to the night vision instrument 15, the user may optionally toggle the device between the open 44 (i.e., the aperture having the second area) and the closed 42 (i.e., the aperture having the first area) states. When the device is in the closed state 42 and attached to the night vision instrument 15, the image captured by the night vision instrument 15 is filtered by the aperture 45 (i.e., allows light to the lens) and the focus of the image viewed by the user through the night vision instrument 15 (i.e., the visual clarity of an object viewed through the instrument) is improved.

In a variant of the device 10 for improving the focus of an image produced by a night vision instrument 15, the housing 35 comprises a cavity 50 configured to conform to an outside surface 55 of the lens frame 25 of the night vision instrument 15. Optionally, the housing 35 may be cylindrical in shape to conform to the typical shape of the lens frame 25 of the typical night vision instrument 15. The conformation of the housing to the outside of the lens frame 25 enables the device 10 to attach to the lens frame 25. The housing 35 is configured to hold the front panel 40 containing the aperture in parallel spatial relationship with the lens 20, when the device 10 is attached to the lens frame 25 and in a closed state 42. In some embodiments, the device is configured to position the aperture 45 as close as possible to the lens 20 without damaging the lens.

In another variant of the device, the panel (cover) 40 containing the aperture 45 is configured to lie adjacent and parallel to an outer rim 60 of the lens frame 25 when the device 10 is attached to the night vision instrument 15 and the device is in a closed state 44.

In a further variant of the device 10 for improving the focus of an image produced by a night vision instrument 15, the housing 35 comprises an outside surface 65 configured to conform to an inside surface 70 of the lens frame of the night vision instrument, for attaching the device to the lens frame 25. The housing is configured to hold the front panel containing the aperture in parallel spatial relationship with the lens, when the device is attached to the lens frame 25.

In still another variant of the device 10 for improving the focus of an image produced by a night vision instrument, the device may include a hinge 75 that connects the panel 40 to the housing 35. The panel 40 containing the aperture 45 can be toggled between a closed state 42 and open state 44 by swinging the panel 40 open and shut via the hinge connection 75.

In yet a further variant of the device for improving the focus of an image produced by a night vision instrument, the device has a locking mechanism 80 for locking the panel in the closed state 42.

In another variant of the device for improving the focus of an image produced by a night vision instrument, the locking mechanism 80 comprises a latch 85 configured for hooking the side 90 of the panel opposite the hinge to a mating surface 95 on the housing 35. The locking mechanism is manually lockable and unlockable by a user.

In a further variant of the device 10 for improving the focus of an image produced by a night vision instrument, the device comprises a securing mechanism 100 for securing the device 10 to the night vision instrument 15.

In still another variant of the device 10 for improving the focus of an image produced by a night vision instrument, the securing mechanism 100 is configured to secure the device 10 to the lens frame 25. The securing mechanism comprises a screw 105 for tightening the device 10 against the lens frame 25.

In yet a further variant of the device 10 for improving the focus of an image produced by a night vision instrument, referring to FIG. 6, the securing mechanism 100 may comprise a lever 110 for shortening a circumference of the housing around the lens frame 25 and securing the device to the outer surface 55 of the lens frame 25. The housing has a gap 120 for shortening and lengthening the circumference of the housing 35 and thus, tightening and loosing the attachment of the housing 35 to the lens frame 25.

In another variant of the device for improving the focus of an image produced by a night vision instrument, referring to FIG. 7, the device has a housing 35 configured to attach to the lens frame 20, and the housing comprises: a side 125; a front panel 40 connected to the side 125 and perpendicular to the side 125; and an aperture 45 disposed in the front panel 40. When the device 10 for improving an image is attached to the night vision instrument 15, the image captured by the night vision instrument 15 is filtered by the aperture 45 and the focus of the image viewed by the user through the night vision instrument is improved.

In a further variant, still referring to FIG. 7, the panel 40 is permanently connected to the side 125 of the housing 35 of the device 10 and permanently oriented perpendicular to the side 125. The device may have a securing mechanism 100 for securing the device to the night vision instrument. The securing mechanism 100 may be configured to secure the device to the lens frame 25 and the securing mechanism 100 may comprise a screw 105 for tightening the device against the lens frame 25.

In still another variant, referring to FIGS. 8-9, the device 10 comprises an assembly 135, comprising a cylinder housing 140 configured to receive an insert 145 in its interior 148. The insert 145 may comprise a side wall 150 and a panel 155 containing an aperture 45. A user may vary the size of the aperture and thus the quality of the focus and the light level in the image, by selecting an insert 145 having a different sized aperture 45. The insert may have a first through hole 160 and the cylinder housing 140 may have a second through hole 162 for receiving a thumb screw 165 to both hold the assembly 135 together and to secure the device 10 to the night vision instrument 15. Optionally, the through holes 160, 162 may be threaded and the thumb screw may screw into them. FIG. 8 illustrates the assembly 135 assembled in an operative state, while FIG. 9 illustrates an exploded view of the assembly.

In some embodiments, the assembly illustrated in FIGS. 8-9 is configured to place the panel containing the aperture as close as possible to the lens 20 of a night vision instrument when the assembly is connected to the night vision instrument 15. In one embodiment, this may be achieved by configuring the insert to receive the lens frame 25 of the instrument 15.

Figure 10:
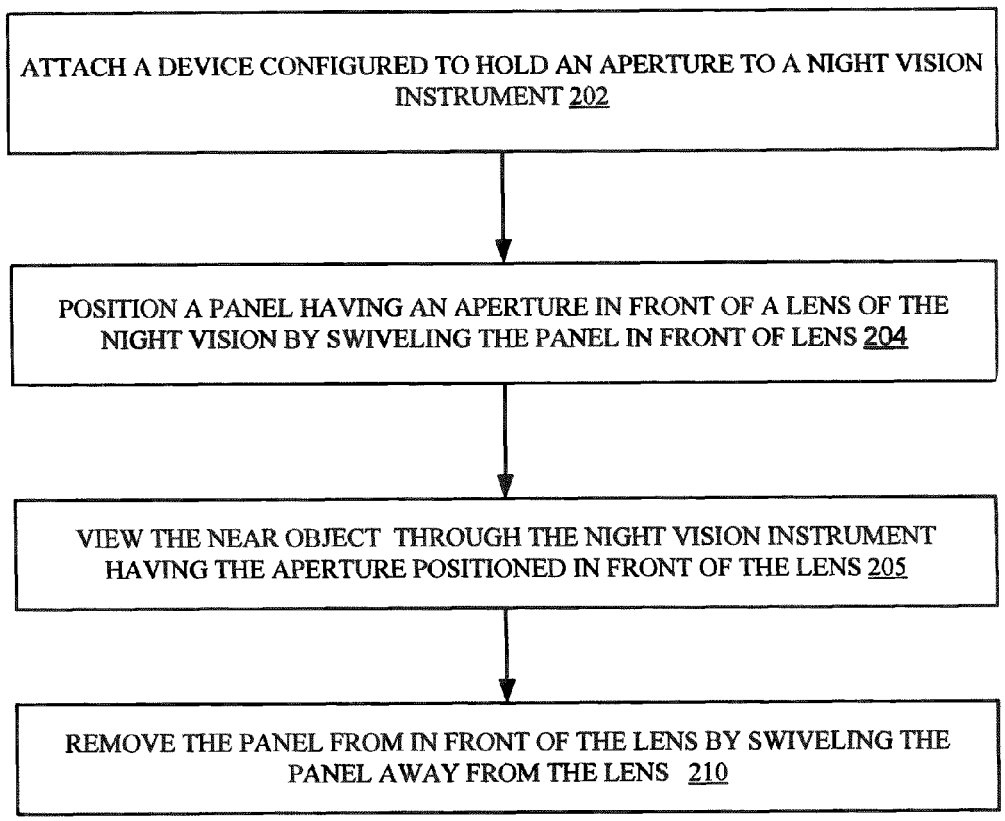
FIG. 10 is a flow chart of a method for operating a night vision instrument for viewing a near object, when the night vision instrument has a focus optimally set to view distant objects.

In still another variant, referring to FIG. 10, a method is provided for operating a night vision instrument for viewing a near object, or in other words, objects close to the user of the night vision instrument, when the night vision instrument has a focus optimally set to view distant objects. The method comprises: in a step 204, positioning a panel having an aperture in front of a lens of the night vision instrument; in a step 205 viewing the near object through the night vision instrument having the aperture positioned in front of the lens; and in a step 210 removing the panel from in front of the lens when viewing near objects clearly is not needed. In one embodiment, the method comprises removing the panel from in front of the lens when more light is preferable to an operator than a clearer image. Optionally, an operator may use infrared light while using the night vision instrument with the panel positioned in front of the lens.

Figure 11:
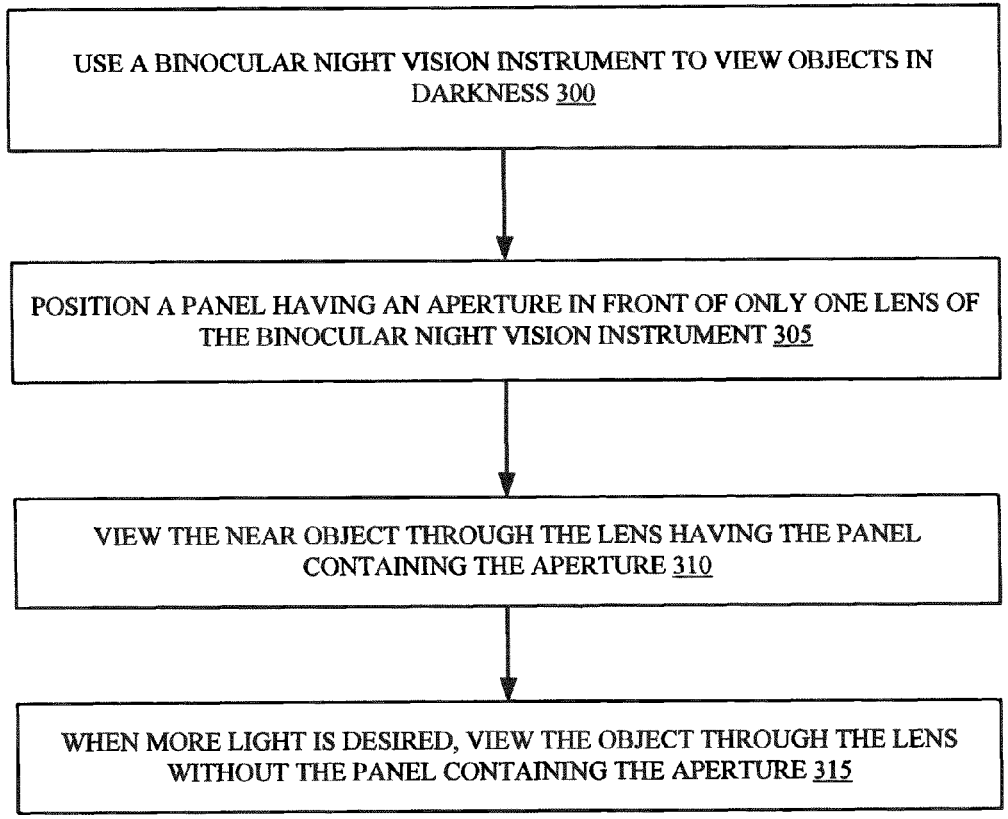
FIG. 11 is a flow chart of a method for operating a binocular night vision instrument, in accordance with the principles of the invention.

In still another variant, referring to FIG. 11, a method of viewing a dark environment comprises: in a step 300 using a binocular night vision instrument; in a step 305 positioning a panel having an aperture in front of only one lens of the binocular night vision instrument; in a step 310 viewing the near object through the lens having the panel containing the aperture; and when more light is desired, viewing the object through the lens without the panel containing the aperture 315.

Figure 12:
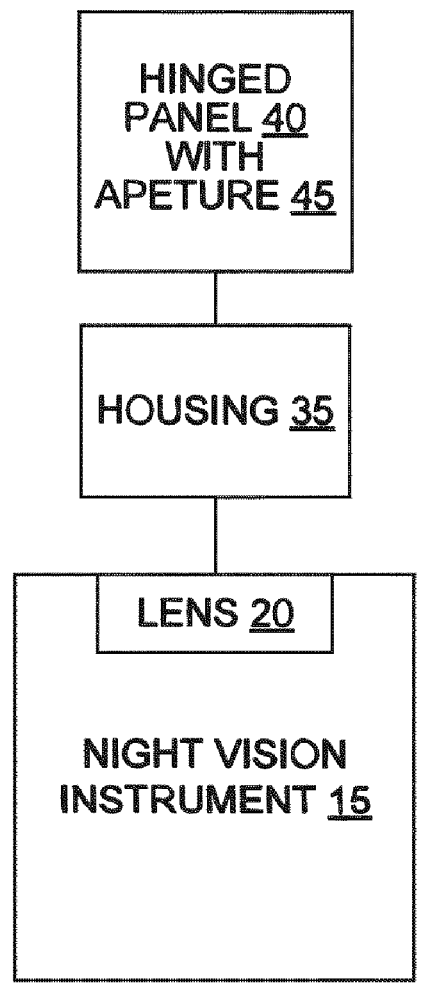
FIG. 12 is a block diagram of an improved night vision instrument configured with an embodiment of the present invention.

In another variant, referring to FIG. 12, a night vision instrument 15 is provided that contains a hinged panel (cover) 40 having an aperture 45 attached to the lens 20 frame. The panel may be attached to a housing 35 via a hinge 75.

In a further variant of the method of operating a night vision instrument, referring to FIG. 10, the method may comprise a step 202 attaching a device to the night vision instrument. The device is configured for holding the panel having an aperture in two states which may be selected by an operator of the night vision instrument. One state comprises positioning the aperture in front of the lens and the other state comprises holding the panel so that the lens is not obscured by the panel.

In another variant of the method of operating a night vision instrument, the step 204 of positioning a panel having an aperture in front of a lens of the night vision instrument comprises swiveling the panel in front of lens.

In yet a further variant of the method of operating a night vision instrument, the step 210 of removing the panel from in front of the lens when viewing near objects with a clearer focus is no longer needed comprises swiveling the panel away from the lens.

Figure 13A:
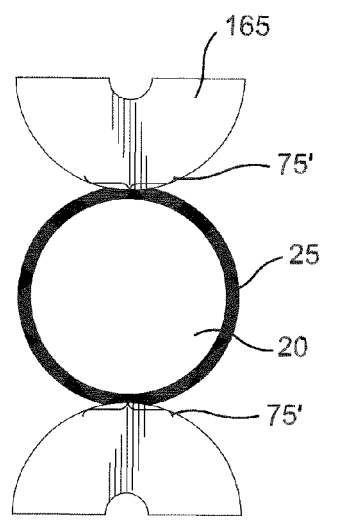
FIG. 13 is a front view of the device illustrating an alternative cover for providing an aperture, where Panel A shows the open cover, Panel B shows the cover partially closed and Panel C shows the cover fully closed.
Figure 13B:
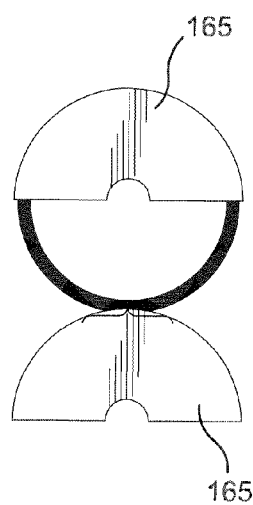
Figure 13C:
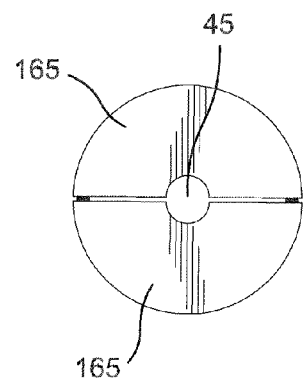
Figures 14A, 14B, 14C:
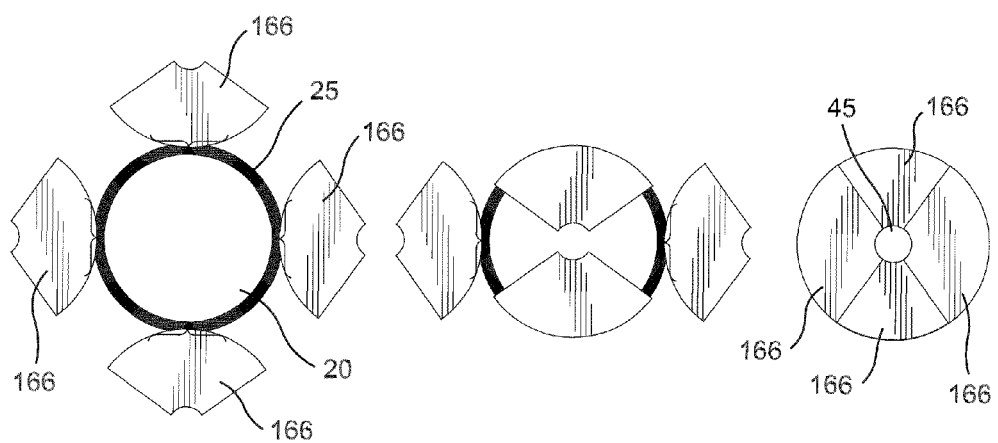
FIG. 14 is a front view of the device illustrating an alternative cover for providing an aperture, where Panel A shows the open cover, Panel B shows the cover partially closed and Panel C shows the cover fully closed.

Embodiments of additional variants are illustrated in FIGS. 13 and 14. In these embodiments, the cover comprises at least two sections, each section comprising a hinge connecting the section to the housing, wherein the superior visual clarity is achieved by swinging the sections over the lens frame to allow light to the instrument lens having the first area. In FIG. 13, the cover comprises two sections 165, each having a hinge 75', mounted on the lens frame 25, that, when closed (Panel C), form an aperture 45 having the first area, which defines the extent of light to the instrument lens 20. Similarly, in FIG. 14, the cover comprises four sections 166, each having a hinge 75', mounted on the lens frame 25, that, when closed (Panel C), form an aperture 45 having the first area, defining the extent of light to the instrument lens 20. In these embodiments, the housing may be attachable to the lens frame, or the housing and lens frame may be the same piece.

Figures 15A, 15B, 15C:
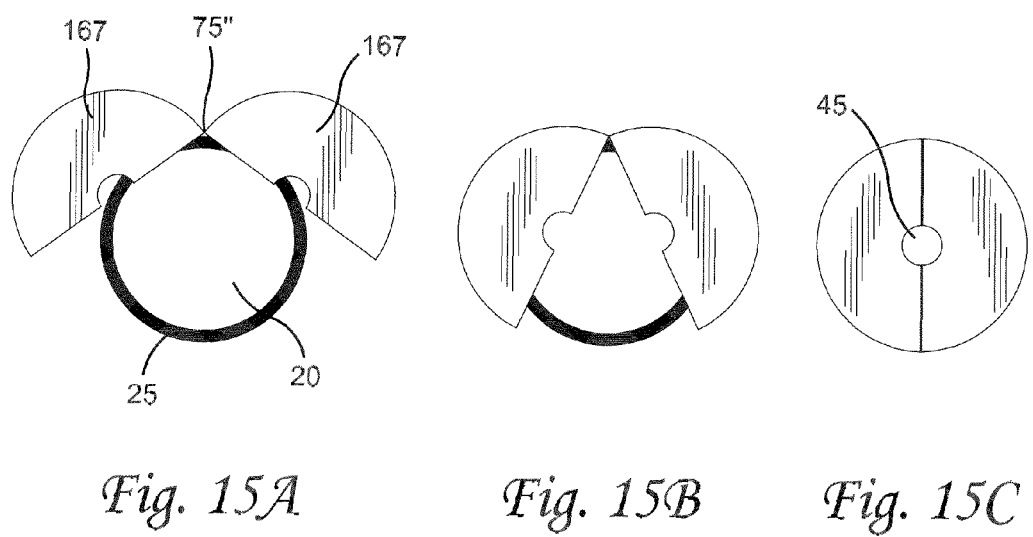
FIG. 15 is a front view of the device illustrating an alternative cover for providing an aperture, where Panel A shows the open cover, Panel B shows the cover partially closed and Panel C shows the cover fully closed.

In some of these embodiments, the hinges can be joined. For example, FIG. 15 illustrates an embodiment where the cover comprises two sections 167, each having a hinge joined at a common point 75", mounted on the instrument lens frame 25, which in this embodiment is also considered the housing. In some embodiments, the housing comprising the hinge may be a separate piece from the lens frame. When closed (Panel C), the two sections 167 form an aperture 45 having the first area, defining the extent of light to the instrument lens 20.

Figures 16A, 16B, 16C, 16D:
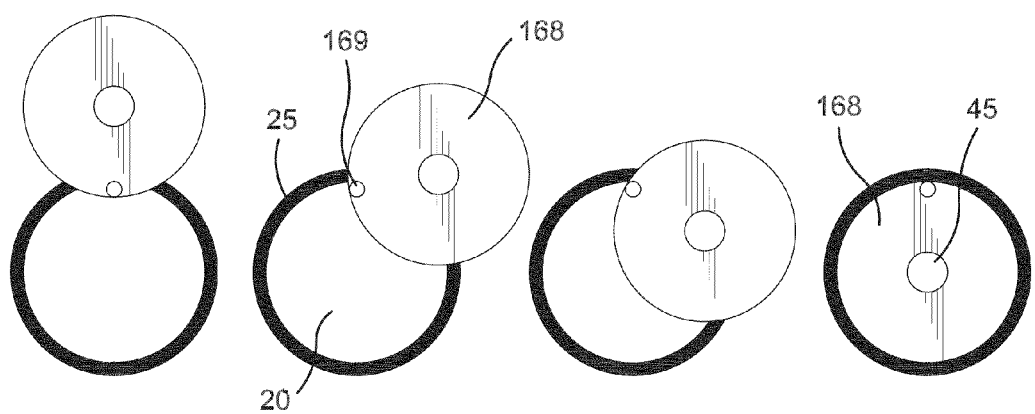
FIG. 16 is a front view of the device illustrating an alternative cover for providing an aperture, where Panel A shows the open cover, Panel B shows the cover partially closed, Panel C shows the cover more closed than Panel B, and Panel D shows the cover fully closed.
Figure 17A:
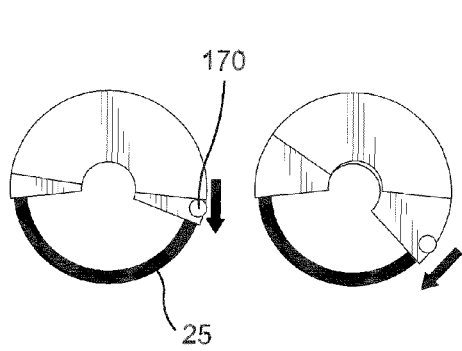
FIG. 17 is a front view of the device illustrating an alternative cover for providing an aperture, where Panel A shows the open cover, Panel B shows the cover partially closed, Panel C shows the cover more closed than Panel B, and Panel D shows the cover fully closed.
Figure 17B:
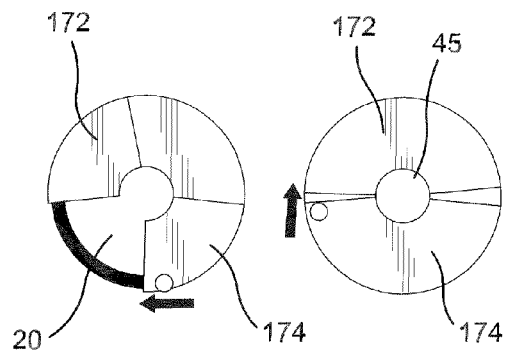
Figure 17C:
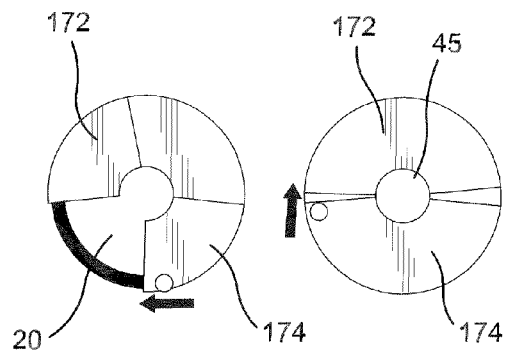
Figure 17D:
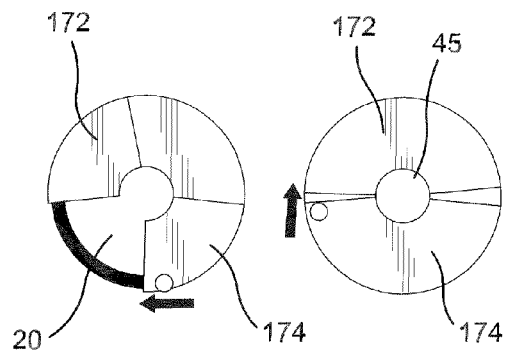

FIG. 16 illustrates another variant, comprising a cover 168 with an aperture 45 that is rotated along the plane of the instrument lens 20 around a pin 169 that joins the cover to the instrument lens frame 25, which in this embodiment is also considered the housing. In some embodiments, the housing comprising the pin may be a separate piece from the lens frame.

FIG. 17 illustrates still another variant, comprising a cover made of a fixed section 172 and a section that rotates around the instrument lens frame 25 with a pin 170 until the cover is closed (Panel D), forming the aperture 45.

FIGS. 15-17 describe covers that open and close along the plane of the lens, rather than perpendicular (i.e., outward) to the lens, as in FIGS. 1-9, 13 and 14. Those embodiments are useful, e.g., when the user is operating the instrument in confined quarters.

Figures 18A, 18B, 18C, 18D:
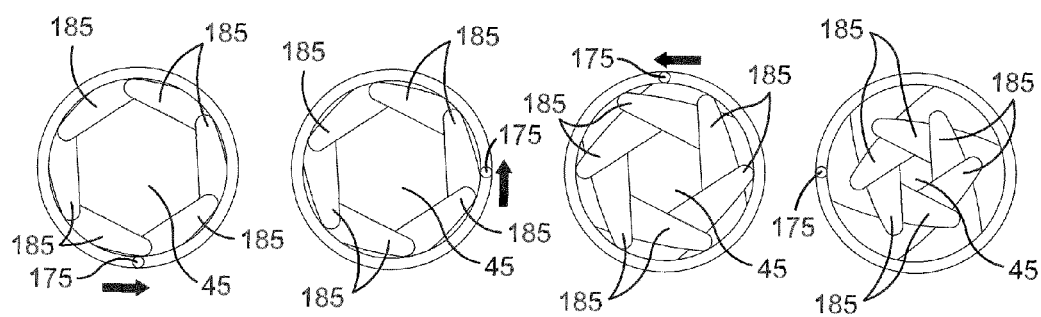
FIG. 18 is a front view of the device illustrating an alternative cover for providing an aperture, where Panel A shows the open cover, Panel B shows the cover partially closed, Panel C shows the cover more closed than Panel B, and Panel D shows the cover fully closed.

Another variant is illustrated in FIG. 18. This variant comprises a ring 175 mounted on the instrument lens frame 25. The aperture 45 is formed as a typical camera iris diaphragm, where thin flat opaque tongues 185 fastened to the ring 175 contract or enlarge the aperture 45 when the ring 175 is rotated. This variant provides a continuously variable aperture, allowing adjustment of aperture size without changing covers.

In a further variant, the cover is a liquid crystal display and the aperture is formed by liquid crystal modifying the opacity of the liquid crystal display to result in an aperture of varying diameter as determined by the user, or of a predetermined size or of predetermined size increments. The aperture may be controlled by the user via a switch, for example, a toggle switch, button or pressure sensitive switch or may be automatically adjusted by a circuit that determines the distance of the object being viewed, as described below. Construction and programming of such a display within the parameters required for a device that fits over a night vision instrument lens would not require undue experimentation by a skilled artisan.

In some embodiments of these devices, the cover is manually adjustable between aperture areas. Non-limiting examples of mechanisms that can effect the manual adjustment are electronic switch, lever, knob, spring release, hinge, latch, and rotating bezel. In other embodiments, the device comprises a component that automatically adjusts the cover between aperture areas. Such components are known in the art, for example as are incorporated in camera autofocus features. See, e.g., U.S. Pat. Nos. 4,147,417; 4,425,031; 5,752,106; 7,570,879, each incorporated herein by reference. In those systems, the component uses ultrasonic sound waves, infrared light, or other means to detect the distance of the object from the camera. It is envisioned that the same components can be utilized to assist in the automatic adjustment of the cover between aperture areas based on the distance of the object from the device.

Any of the above-described devices can further comprise an infrared light source to assist in visualizing objects. See Example 1, establishing that infrared light can improve visual clarity.

Also provided herewith is a night vision instrument comprising any of the above-described devices. In some embodiments, the device is separable from the instrument. In other embodiments, the instrument lens frame incorporates the housing. In additional embodiments, the housing is permanently affixed to the lens frame, such that the device is integrated into the night vision instrument.

EXAMPLE 1

Figure 19:
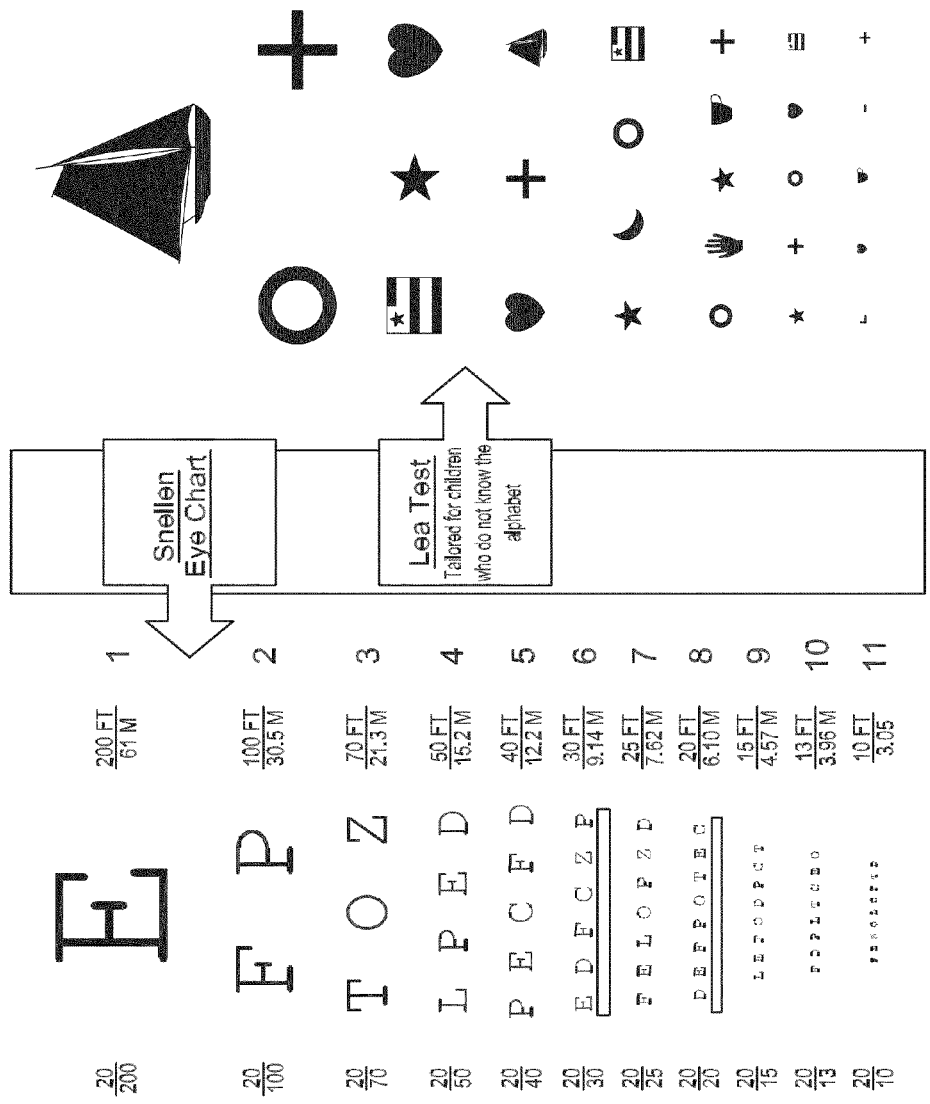
FIG. 19 is an illustration of the Snellen eye chart and Lea test chart.

Effect of Aperture Size and Incident Infrared on Ability to Focus Through a Night Vision Instrument Night vision goggles were used to evaluate the ability to focus on either a Snellen eye chart, or a Lea test (FIG. 19) at various distances (1, 2, 3, 4, 5, 10, 15 and 20 feet), and in the presence or absence of infrared light. In some tests, a rubber washer, 1/16" thick, with a drilled hole for the aperture, was placed on one lens of the goggles to determine the effect of the aperture on the ability to focus. The aperture diameters tested were 1/16", 1/8", and 13/64".

Figure 20A:
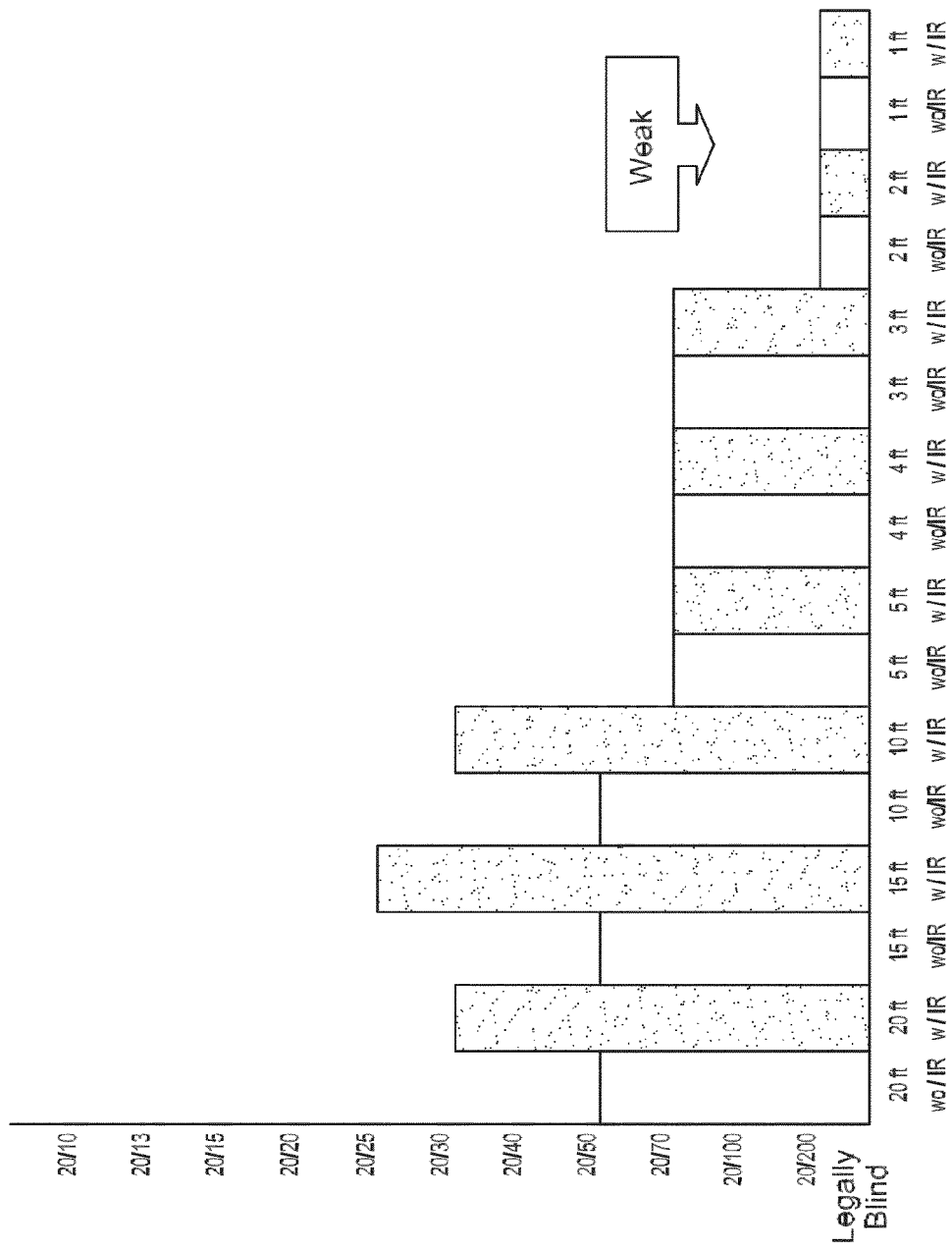
FIG. 20 is bar graphs showing the effect of no aperture (Panels A and B), and apertures of 1/16" (Panels C and D), 1/8" (Panels E and F) or 13/64" (Panels G and H) on the ability to focus (visual clarity) using either the Snellen eye chart (Panels A, C, E and G) or the Lea test (Panels B, D, F and H) in the presence or absence of an infrared light source.
Figure 20B:
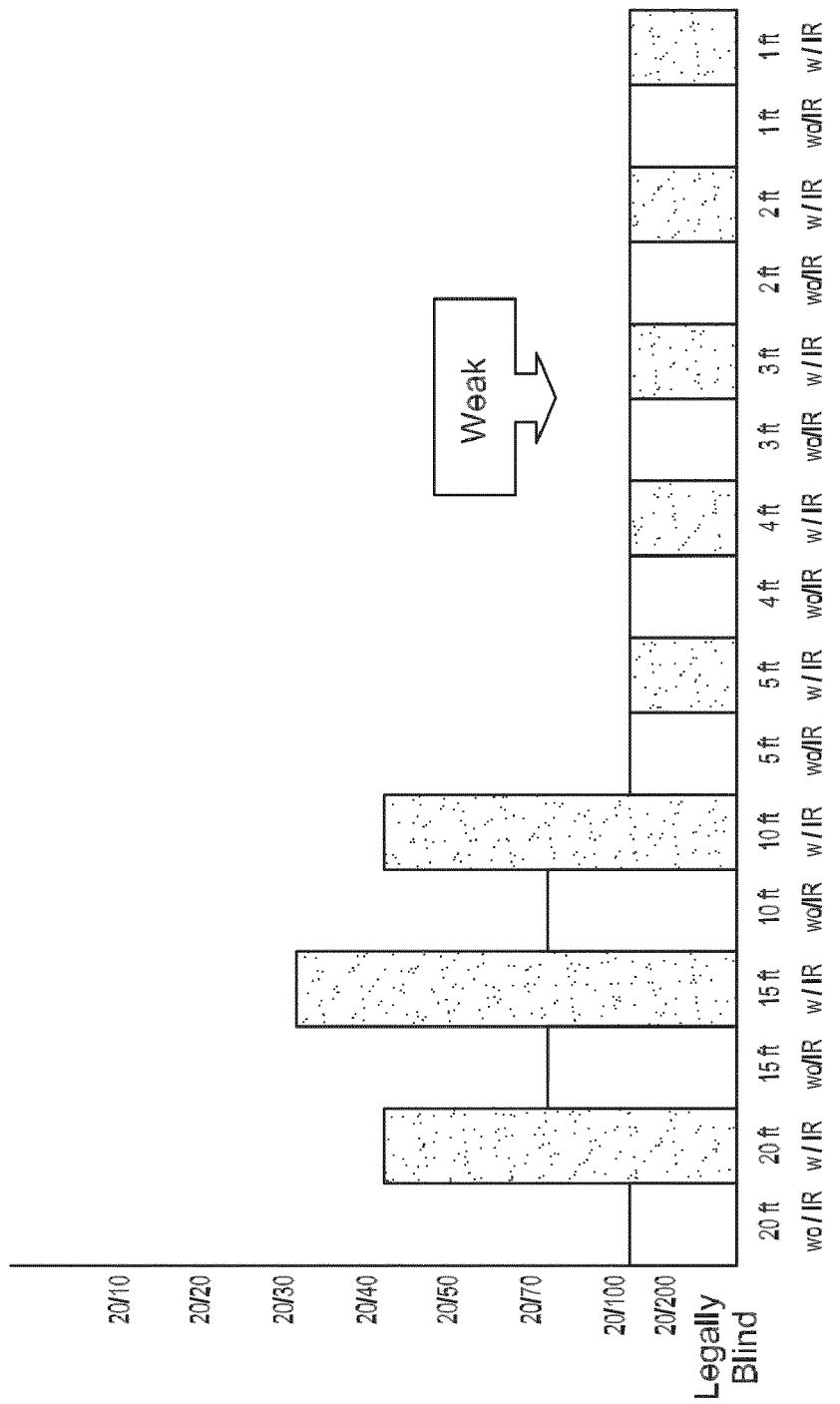

FIGS. 19A and B shows the results when no cover was used to modify the aperture area. Visual clarity was generally better with the Snellen chart (FIG. 20A) than with the Lea test (FIG. 20B). With both tests, infrared light aided visual clarity at 10 ft. or greater. Visual clarity was poor at 5 ft. or less.

Figure 20C:
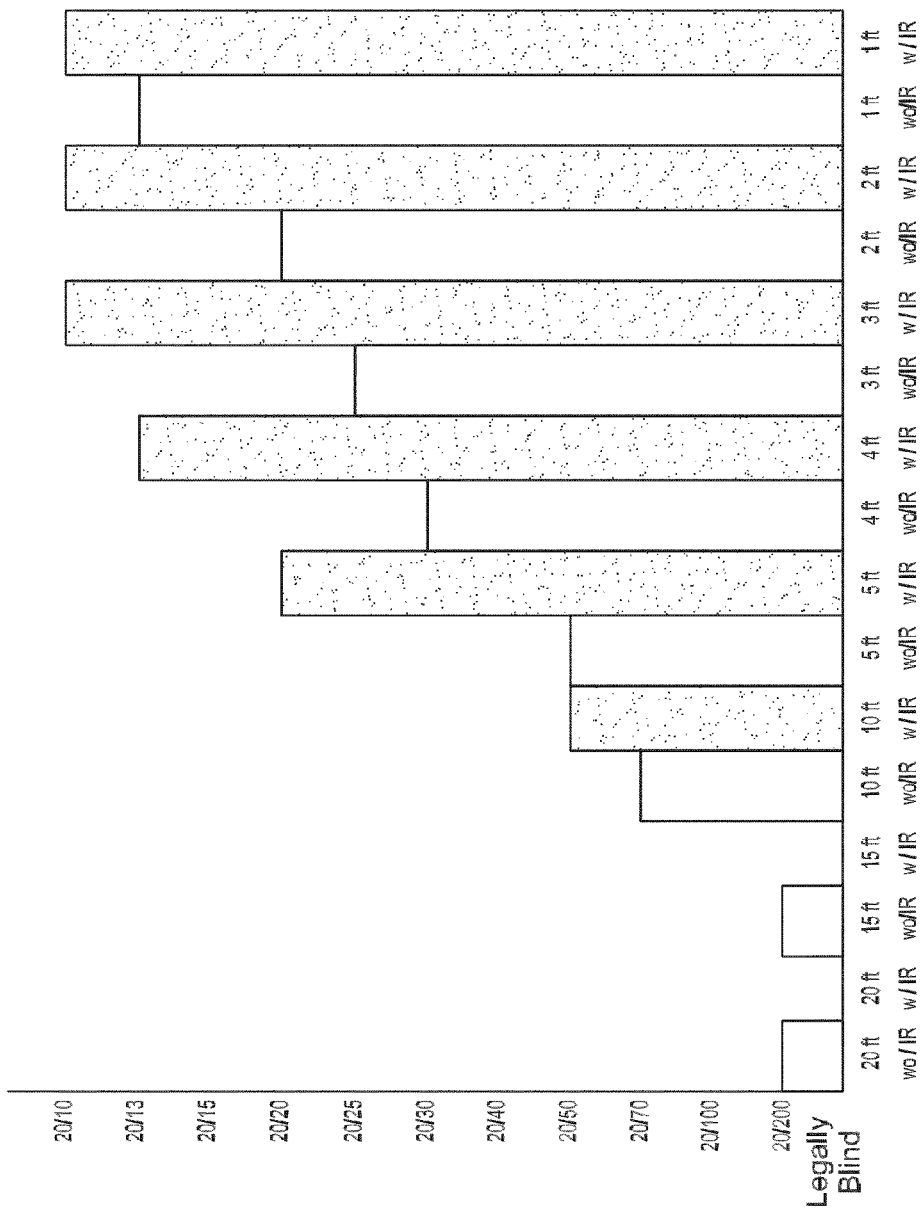
Figure 20D:
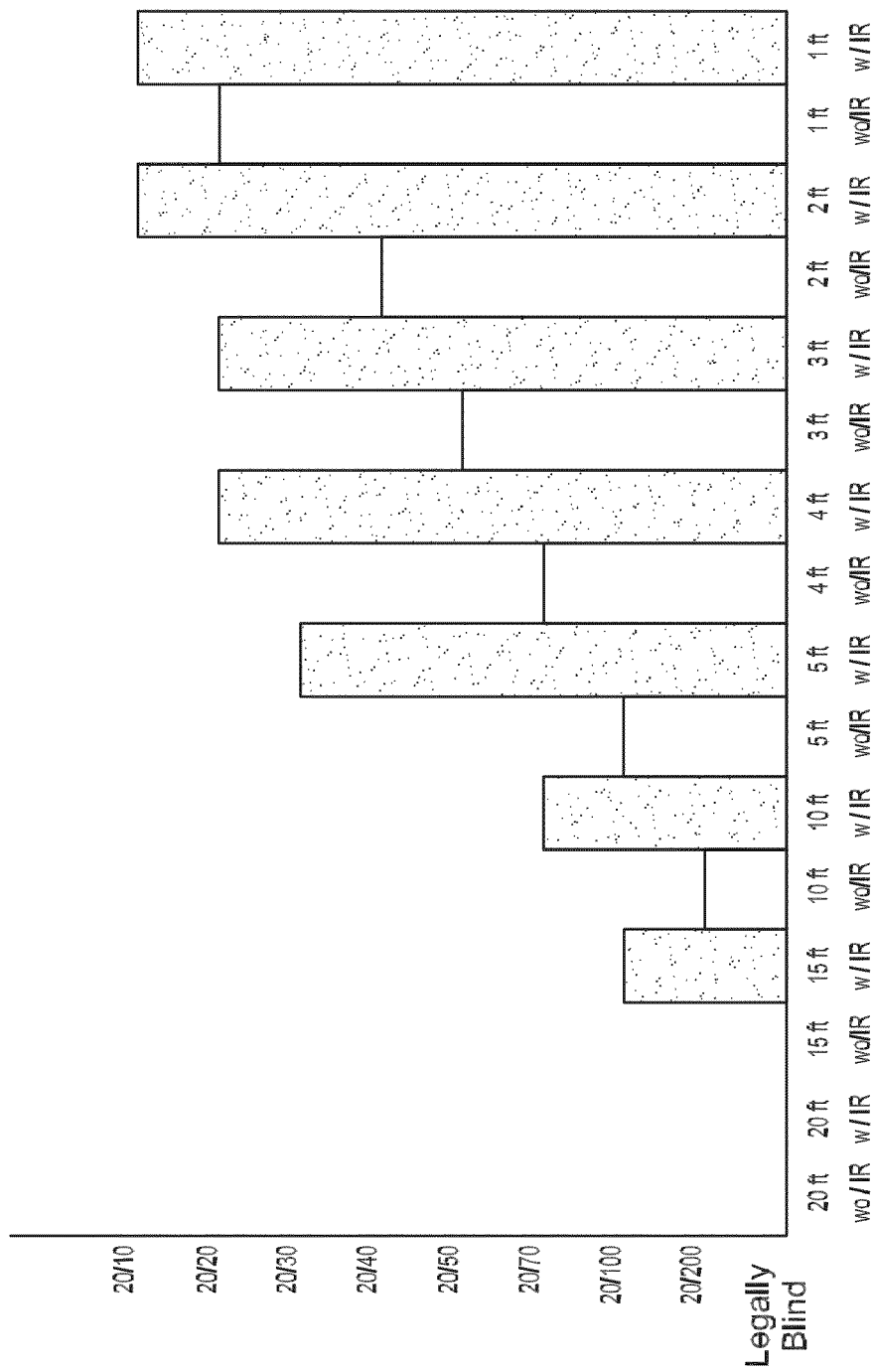

When an aperture having a diameter of 1/16" was used, visual clarity at 5 ft or less was greatly improved with both the Snellen chart (FIG. 20C) and the Lea test (FIG. 20D) over the corresponding tests using no cover to modify the aperture area. At those distances, infrared light aided the visual clarity.

Figure 20E:
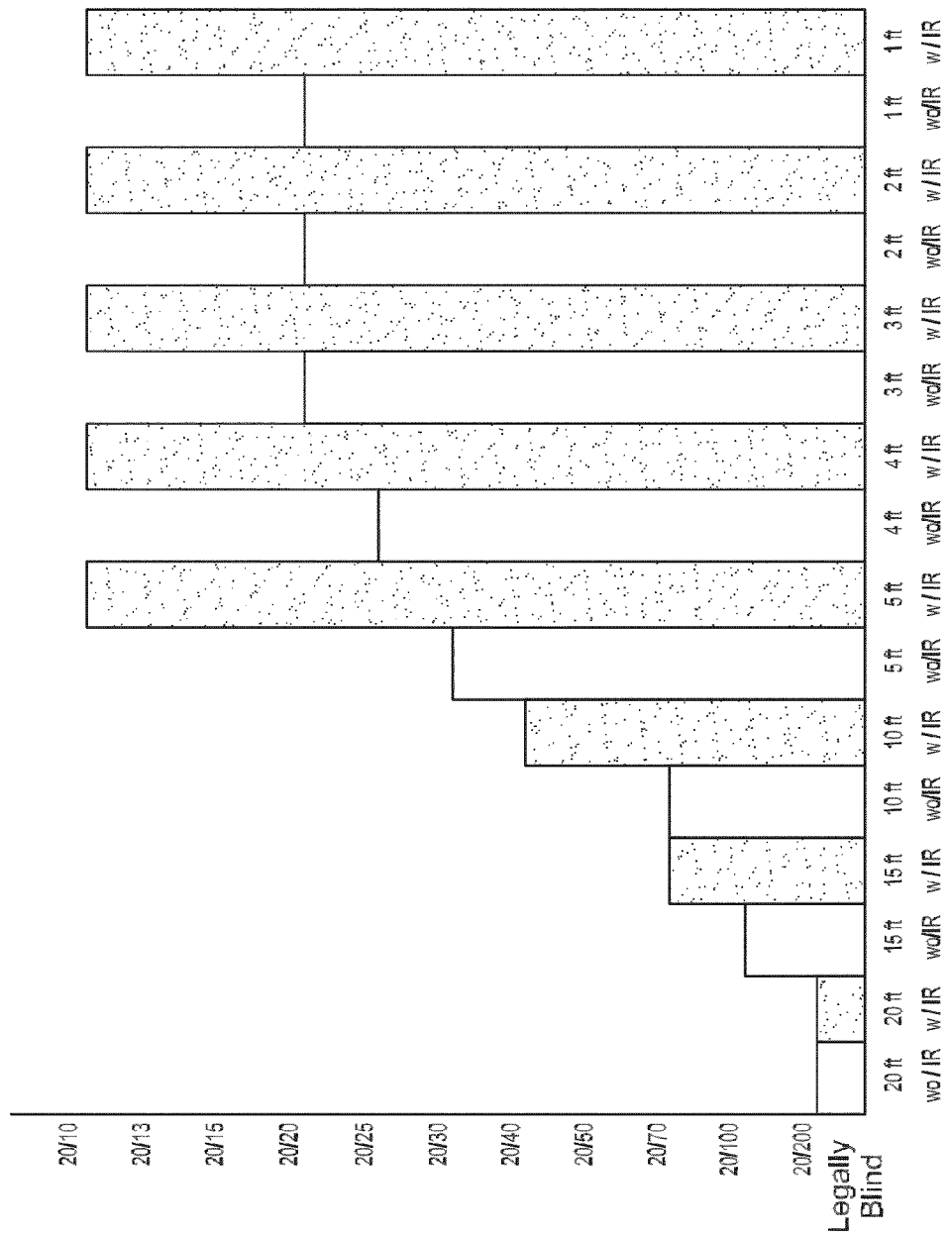
Figure 20F:
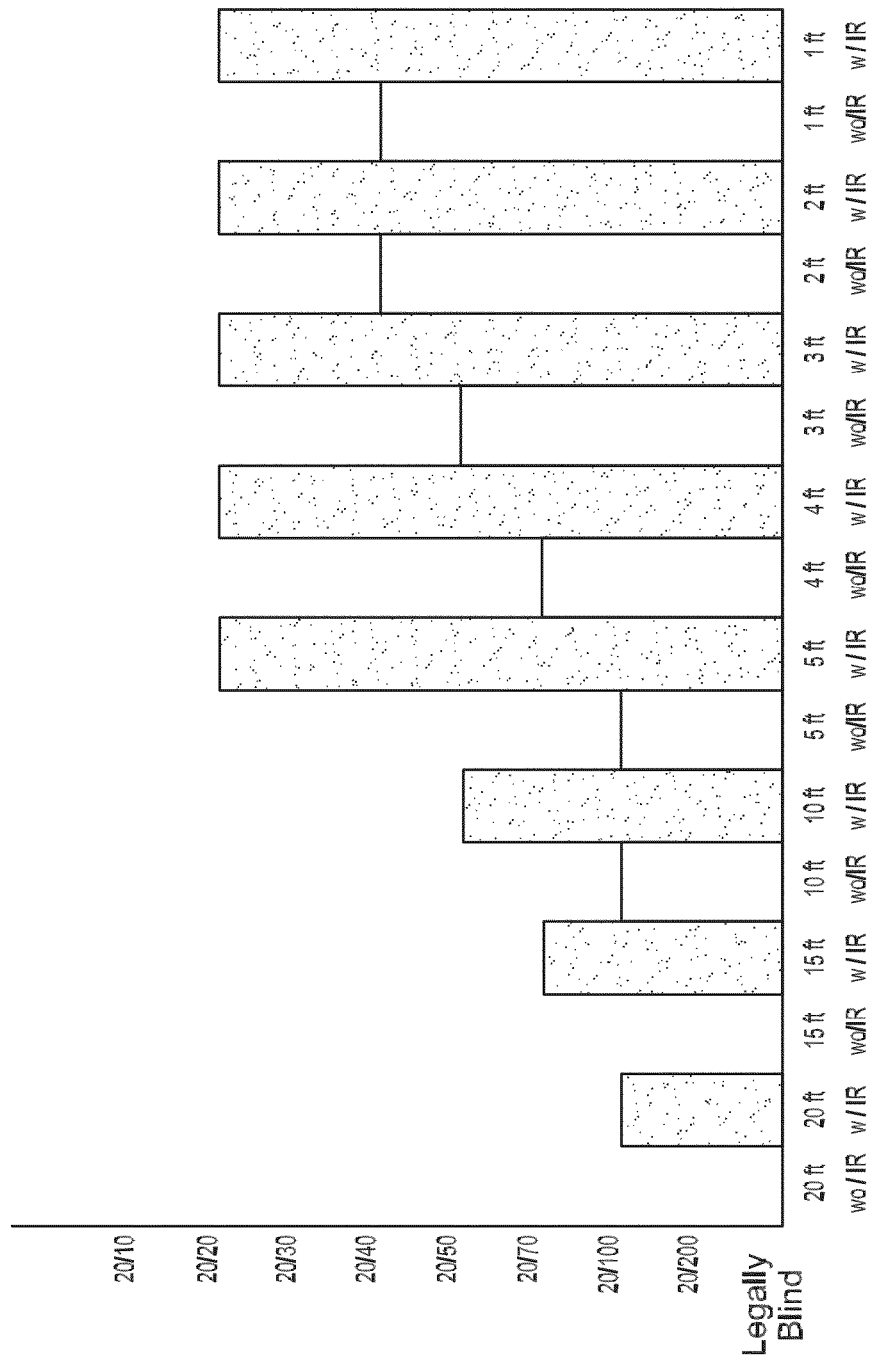

An aperture of 1/8" also greatly improved visual clarity at 5 ft. or less (FIG. 20E, F) over the corresponding no aperture tests. However, at the shortest distance (1 ft.), the 1/16" aperture was superior to the 1/8" aperture. Conversely, the 1/8" aperture provided visual clarity superior to the 1/16" aperture at the 5 and 10 ft. distance, particularly when infrared light was utilized. Infrared light greatly aided clarity at 5 ft or less.

Figure 20G:
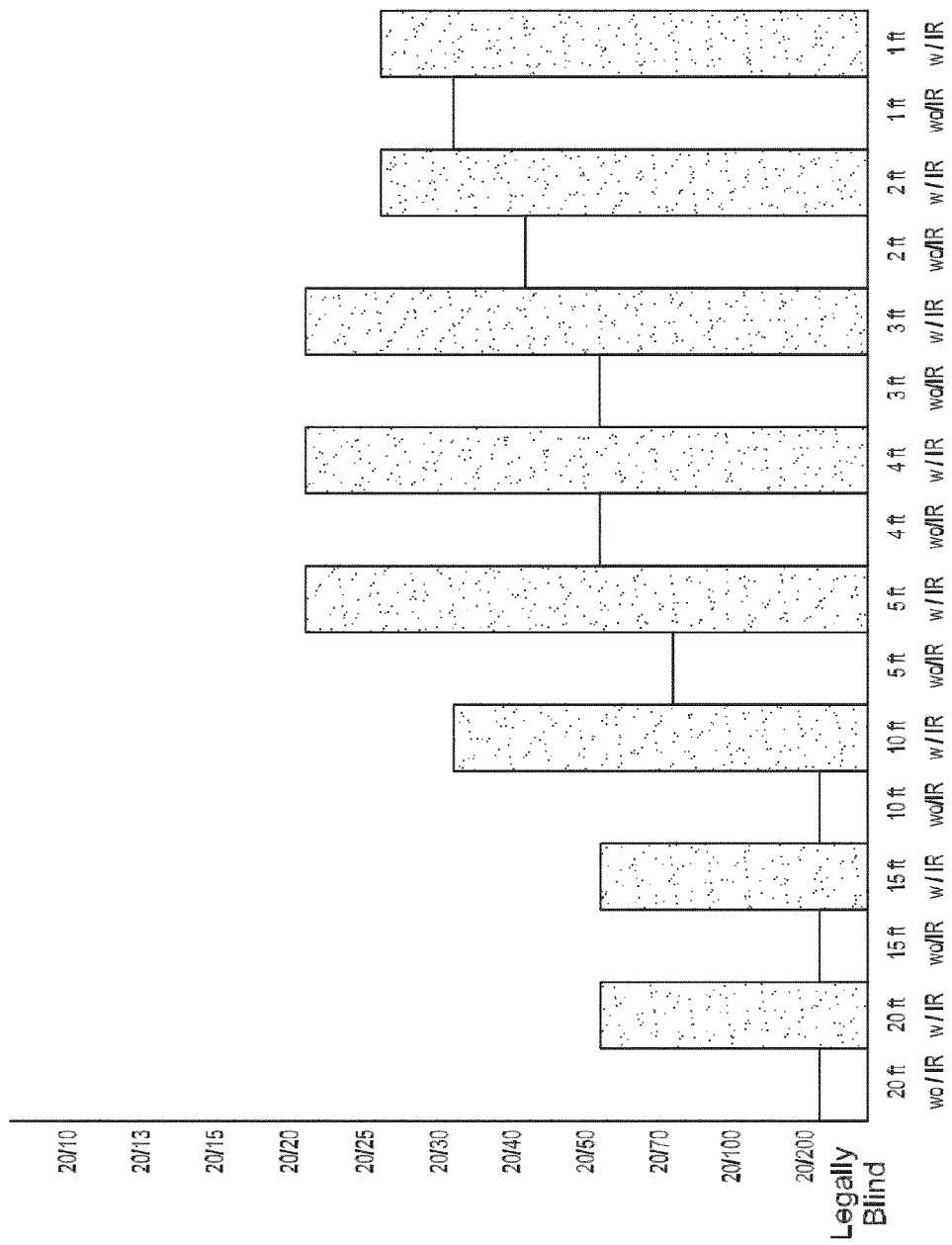
Figure 20H:
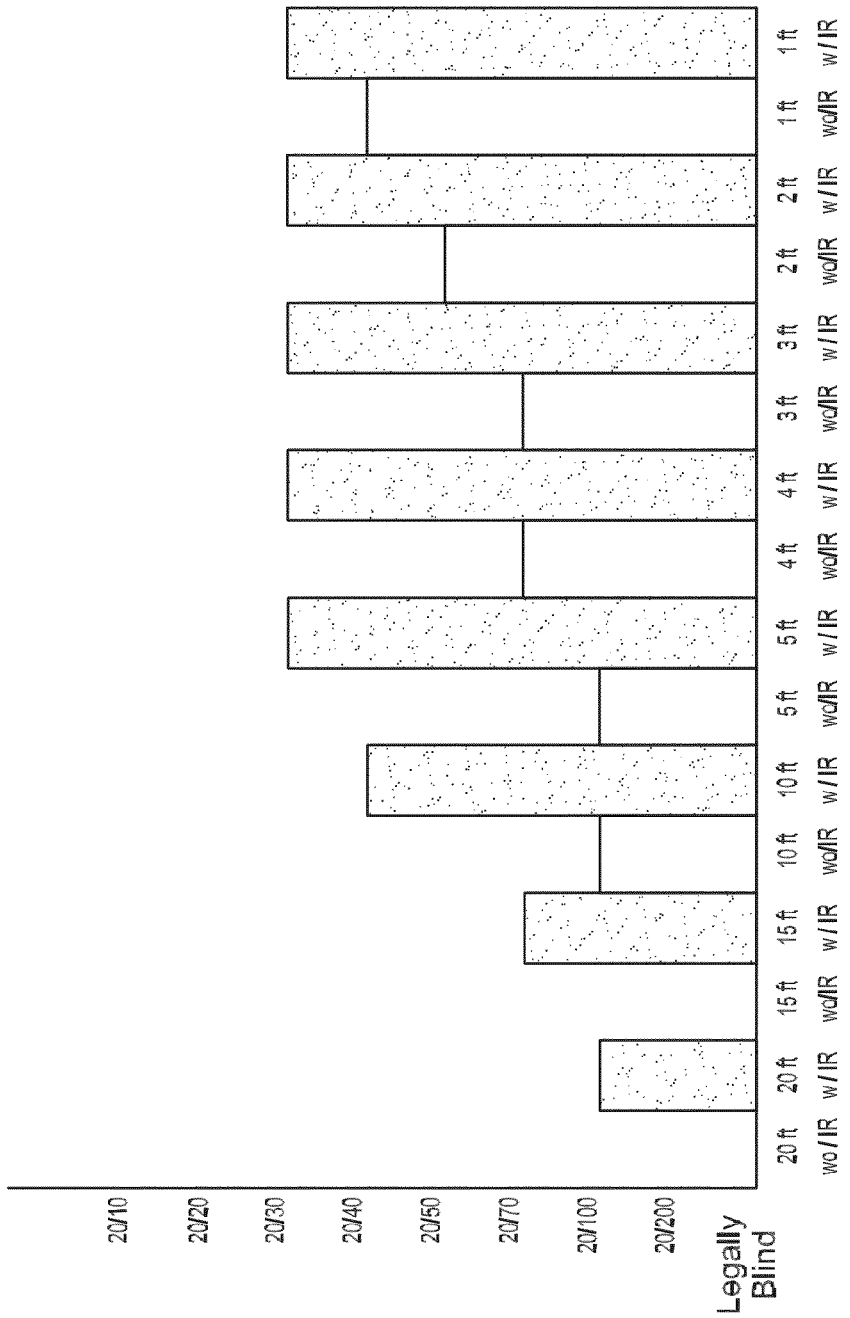

When the 13/64" aperture was used (FIG. 20G, H) visual clarity at all distances was similar to the results with the 1/8" aperture when the Lea test was used. However, when the Snellen chart was used, the 13/64" aperture provided inferior visual clarity at 5 ft. or less but superior visual clarity at 10 ft. or greater, particularly when infrared light was used.

EXAMPLE 2

Effect of Aperture Distance from Lens on Field of View Width

A 13/64" aperture, as used in the tests described in Example 1, was placed over a night vision instrument lens at a distance from the lens of 2/16", 3/16", 1/4", 6/16", 1/2", and 10/16". The 2/16" distance was achieved by placing the aperture-bearing washer on the lens frame, which protruded beyond the plane of the lens by 2/16". The other distances were achieved by stacking washers that were 1/16" thick between the aperture and the lens frame. The width of the field of view (horizontal field of view) was measured at 1, 2, 3, 4, 5, 10, 15 and 20 feet. The measurements are provided in Table 1. The 1/4" and 1/2" measurements are not provided because they were the same in all cases as the 6/16" and 10/16" measurements, respectively.

FIG. 1. Horizontal field of view at various distances through a night vision instrument having a 13/64" aperture spaced at various distances from the lens.

Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the

|  |  | Distance from instrument - feet | | | | | | | |
|---|---|---|---|---|---|---|---|---|---|
|  |  | 1 | 2 | 3 | 4 | 5 | 10 | 15 | 20 |
| Aperture | 2/16 | 11 in. | 22 in. | 26 in. | 40 in. | 50 in. | 13 ft | 12 ft. | 15 ft. |
| distance | 3/16 | 10 in. | 20 in. | 24 in. | 35 in. | 47 in. | 12 ft | 11 ft. | 13.5 ft. |
| from lens - | 6/16 | 9 in. | 18 in. | 22 in. | 33 in. | 41 in. | 11.5 ft | 10 ft. | 12.5 ft. |
| inches | 10/16 | 8 in. | 16 in. | 20 in. | 31 in. | 38 in. | 11 ft | 9.5 ft. | 11.5 ft. |

As expected, the horizontal field of view increases with increasing distance from the instrument and decreasing aperture distance from the lens.

While various embodiments of the present invention have been described above, it should be understood that they have been presented by way of example only, and not of limitation.

art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether CTRL logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

All references cited in this specification are hereby incorporated by reference. The discussion of the references herein is intended merely to summarize the assertions made by the authors and no admission is made that any reference constitutes prior art. Applicants reserve the right to challenge the accuracy and pertinence of the cited references.

What is claimed is:

1. A device for improving the focus of an object viewed using a night vision instrument, the night vision instrument comprising an instrument lens, a lens frame comprising a distal end, and night vision components, the device comprising:
    a housing configured to couple to the distal end of the lens frame; and
    a cover coupled to the housing,
        wherein, when the housing is coupled to the lens frame, the cover is adjustable to define an aperture allowing light to the lens, the aperture being variable between having at least a first area and a second area, the first area being smaller than the second area;
    wherein when the device is coupled to the night vision instrument, the visual clarity of the object viewed through the instrument and device is superior to the visual clarity of the object when viewed using the instrument without the device, when the object is within 3 feet of the device and the aperture has the first area; and
    wherein the device does not comprise a device lens.

2. The device of claim 1, wherein the aperture having the first area is circular.

3. The device of claim 1, wherein the aperture having the first area is not circular.

4. The device of claim 1, wherein the cover is circular.

5. The device of claim 1, wherein the cover is not circular.

6. The device of claim 1, wherein the housing comprises a ring and the cover comprises an iris diaphragm that forms the aperture, the iris diaphragm comprising thin flat opaque tongues fastened to the ring that contracts or enlarges the aperture when the ring is rotated.

7. The device of claim 1, wherein the cover is a liquid crystal display and the aperture is formed by liquid crystal modifying the opacity of the liquid crystal display.

8. The device of claim 1, wherein the first area has a maximum diameter of about 13/64" or less.

9. The device of claim 1, wherein the first area has a maximum diameter of about 1/8" or less.

10. The device of claim 1, wherein the second area has an area of the lens.

11. The device of claim 1, wherein the cover is about 10/16" or less from the instrument lens.

12. The device of claim 1, wherein the cover is about 3/16" or less from the instrument lens.

13. The device of claim 1, wherein the cover is disposed at the distal end of the lens frame.

14. The device of claim 1, further comprising an infrared light source.

15. The device of claim 1, wherein the cover comprises an opening having the first area, the cover further comprising at least one hinge coupling the cover to the housing, wherein the superior visual clarity is achieved by swinging the cover over the instrument lens frame to allow light to the instrument lens having the first area, and the aperture having the second area is achieved by swinging the cover away from the lens frame, and
    wherein the second area is equal to the area of the instrument lens without the device.

16. The device of claim 15, wherein the cover comprises at least two sections, each section comprising a hinge coupling the section to the housing, wherein the superior visual clarity is achieved by swinging the sections over the lens frame to allow light to the instrument lens having the first area.

17. The device of claim 1, wherein the cover is manually adjustable between aperture areas.

18. The device of claim 17, wherein the manual adjustment is by electronic switch, lever, knob, spring release, hinge, latch, or rotating bezel.

19. The device of claim 1, further comprising a component that automatically adjusts the cover between aperture areas.

20. The device of claim 19, wherein the component that automatically adjusts the cover between aperture areas uses ultrasonic sound waves or infrared light to detect the distance of the object from the device.

21. A night vision instrument comprising the device of claim 1.

22. The night vision instrument of claim 21, wherein the lens frame incorporates the housing.

23. The night vision instrument of claim 21, wherein the housing is permanently affixed to the lens frame.

* * * * *